Inventor
A. Cervinka

United States Patent Office 2,999,517
Patented Sept. 12, 1961

2,999,517
AUTOMATIC FILLING DEVICE FOR TRAVELLING MOULDS
Anthony Cervinka, Batawa, Ontario, Canada, assignor to Bata Shoe Company of Canada Limited, Batawa, Ontario, Canada
Filed Sept. 15, 1958, Ser. No. 761,089
Claims priority, application Canada Jan. 17, 1958
1 Claim. (Cl. 141—137)

The present invention relates to a device for automatically filling containers, such as containers travelling in a conveyor system. The invention is especially designed for use with automatic conveyor apparatus used for slush moulding processes.

In slush moulding, open moulds are conveyed on a belt conveyor or on a chain and trolley conveyor such as disclosed in applicant's copending U.S. patent application Serial No. 761,179, filed September 15, 1958, now U.S. Patent No. 2,960,211.

The travelling moulds are filled partially or completely one or more times during the moulding process, and these operations are conventionally carried out by hand. The automatic apparatus described hereinafter eliminates the inevitable variations and errors of manual operation.

Figure 1:
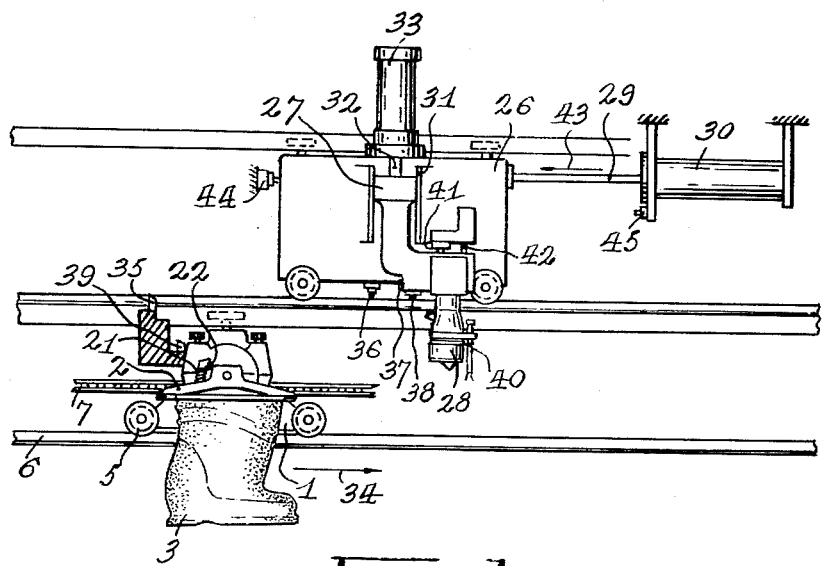
Figure 2:
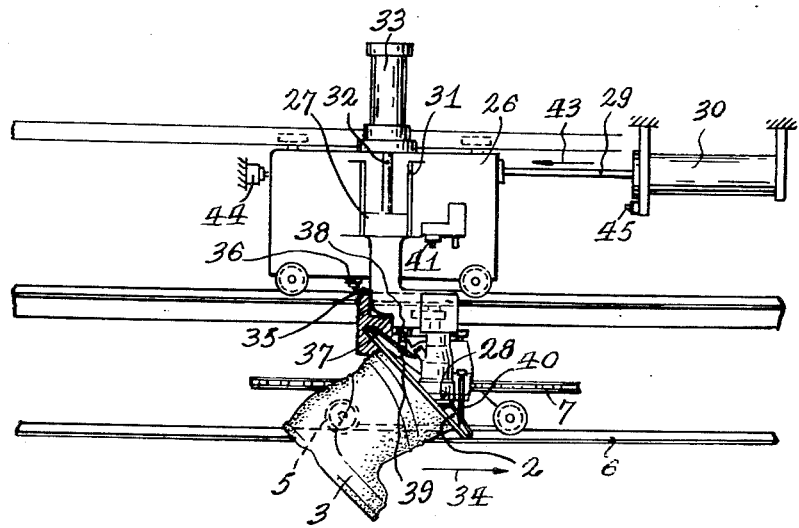

In the attached drawings:
FIG. 1 is a side view of the device showing the automatic filling device in its elevated starting position.
FIG. 2 is a side view of the device in filling position.

In FIG. 1, a filling gun carrier 26 carries a filling gun elevator 27, which in turn carries filling gun 28 which is connected to a supply of liquid material by means not shown. The filling gun carrier 26 is attached to a piston rod 29, which terminates in a piston (not shown) contained within cylinder 30. Elevator 27 rides in bearing 31, and is attached to piston rod 32 which terminates in a piston (not shown) contained within cylinder 33.

A mould 3 is attached to mould carrier 2 of mould carrier trolley 1. The mould carrier 2 is pivotally mounted on mould carrier trolley 1 at bearing 18, and wheels 4 and 5 of the trolley carrier 2 ride on track 6. The trolley 1 is provided with raised shoulders 35 and flange 39.

Switches are provided on the filling gun mechanism as follows: Switches 36 and 38 on the underside of filling gun carrier 26; switch 44 is mounted to meet the filling gun carrier 26 on the side furthest from cylinder 30; and switch 45 is located on the cylinder 30, facing the filling gun carrier 36. A control float 40 is located on filling gun 28.

In operation the mould 3 is carried by mould carrier trolley 1, in the direction of arrow 34, the trolley being pulled by conveyor chain 7, and rolling on wheels 4 and 5 on track 6. Shoulder 35 on mould carrier trolley 1 is aligned with switch 36 on the filling gun carrier 26. As the trolley 1 advances, it will be seen that the shoulder 35 will contact switch 36. When the switch 36 closes the cylinder 33 is actuated to lower the elevator 27 which descends until pad 37 meets the leading edge of shoulder 35 and switch 38 on elevator 27 meets flange 39 on trolley 1. When switch 38 closes, the downward movement of elevator 27 is stopped, and filling gun 28 is opened.

Referring now to FIG. 2, the elevator 27 is shown in filling position, with switch 38 in contact with flange 39, shoulder 35 in contact with pad 37, and filling gun 28 partially enclosed in mould 3. The relative position of the filling gun 28 within the mould 1 is maintained for a sufficient time to partially or completely fill the mould as desired. In FIG. 2 the mould 3 is shown in tilted position, as described in applicant's copending U.S. patent application Serial No. 761,179, filed September 15, 1958, now U.S. Patent No. 2,960,211.

It should be noted that the travel of the trolley 1 is continuous and the filling of the mould 3 is completed with no interruption of this travel, in the direction of arrow 34. The filling gun carrier 26 is free to travel in the direction of the arrow 34, and when the shoulder 35 of trolley 1 meets pad 37 on elevator 27, the elevator 27 and hence the carrier 26 and the filling gun 28 are pushed in the direction of arrow 34. The mould is filled as desired during this travel.

When the level of the liquid in the mould 3 contacts control float 40 the filling gun 28 is closed and the cylinder 33 is actuated to raise the elevator 27 so that the gun 28 is completely removed from the mould. The rising elevator 27 contacts and closes switches 41 and 42. Switch 41 stops the upward movement of the elevator 27. Switch 42 actuates cylinder 30 which returns the carrier 26 in the direction of arrow 43, until the carrier 26 meets and closes switch 44, stopping the carrier 26 in the position illustrated in FIG. 1.

In the event the control float 40 fails to activate the piston-cylinder unit 33 to raise the filling gun 28, due to a mechanical failure of the float, the trolley will carry the filling gun and the gun carrier to the right until the carrier 26 contacts a safety switch 45. The operation of the switch 45 is the same as the operation of the control float 40, namely, the switch activates the piston-cylinder unit 33 to elevate the gun away from the mold 3. The filling gun 26 thus being clear of the mold activates the switches 41 and 42, thereby returning the filling gun and gun carrier 26 to the left-most position for cooperation with the next empty mold.

The above description is by way of example, and applicant should not be limited as to various modifications in the invention, except by the appended claim.

I claim:
An apparatus for automatically filling open ended molds including continuously horizontally moving conveying means, open ended molds carried by the conveying means, a carrier means mounted above the conveying means for horizontal travel relative to the conveying means, a filling gun means adapted to contain and introduce material into the open ended molds, means mounting the filling gun means for upward and downward movement relative to the containers, a cylinder and piston unit operably connected to said mounting means to move the mounting means upward and downward, switch means on the carrier means to actuate the piston and cylinder unit to move the mounting means downward, shoulder means on the conveying means for contacting the switch means to operate the switch means for moving the mounting means and filling gun means downward to engage a mold, further switch means on the mounting means operative to stop the downward movement of the mounting means, flange means on the conveying means spaced from the shoulder means for engaging the further switch means on the mounting means whereby such further switch means is operative to stop the downward movement of the mounting means and allow the filling gun means to introduce material into the mold, said shoulder being engageable with the mounting means when the mounting means is in the downward position to move the carrier means with the conveying means while the filling gun means is introducing material into the mold, means on the filling gun means operative when a predetermined quantity of material has been introduced into the mold to actuate said piston and cylinder unit to move the mounting means and filling gun means upward, switch means on the carrier means in the path of movement of the mounting means operative when engaged by the mounting means to actu- ate the piston and cylinder unit to stop the upward movement of the mounting means, a second piston and cylinder unit operably connected to the carrier means to move the carrier means in a direction opposite to that of the conveying means when the upward movement of the mounting means has been stopped, and additional switch means on the carrier means in the path of movement of the mounting means effective when engaged by the mounting means to actuate said second piston and cylinder unit to move the carrier means in said opposite direction.

References Cited in the file of this patent
UNITED STATES PATENTS

| | | |
|---|---|---|
| 1,992,464 | Blackman | Feb. 26, 1935 |
| 2,845,099 | Bailey | July 29, 1958 |